United States Patent
Verrall et al.

(10) Patent No.: US 8,728,449 B2
(45) Date of Patent: May 20, 2014

(54) WATER-SOLUBLE FILM ARTICLE HAVING SALT LAYER, AND METHOD OF MAKING THE SAME

(75) Inventors: Andrew P. Verrall, Crown Point, IN (US); Steven G. Friedrich, Valparaiso, IN (US)

(73) Assignee: Monosol LLC, Merrillville, IN (US)

( * ) Notice: Subject to any disclaimer, the term of this patent is extended or adjusted under 35 U.S.C. 154(b) by 854 days.

(21) Appl. No.: 11/205,377

(22) Filed: Aug. 17, 2005

(65) Prior Publication Data

US 2006/0165625 A1 Jul. 27, 2006

Related U.S. Application Data

(60) Provisional application No. 60/646,432, filed on Jan. 22, 2005, provisional application No. 60/646,454, filed on Jan. 22, 2005.

(51) Int. Cl.
| | |
|---|---|
| *A61K 8/81* | (2006.01) |
| *A61K 8/73* | (2006.01) |
| *B32B 1/06* | (2006.01) |
| *B32B 7/00* | (2006.01) |
| *A61K 47/00* | (2006.01) |

(52) U.S. Cl.
USPC ....... 424/70.11; 424/70.13; 264/4; 514/772.2

(58) Field of Classification Search
None
See application file for complete search history.

(56) References Cited

U.S. PATENT DOCUMENTS

| | | | | |
|---|---|---|---|---|
| 2,760,942 | A | * | 8/1956 | Oakley ........................ 428/349 |
| 3,294,540 | A | * | 12/1966 | Goffe ........................... 430/264 |
| 3,413,229 | A | * | 11/1968 | Bianco et al. ................. 510/296 |
| 3,431,166 | A | * | 3/1969 | Ishibashi Yasuaki et al. 162/135 |
| 3,528,921 | A | | 9/1970 | Gray |
| 3,563,241 | A | * | 2/1971 | Evans et al. ................... 604/364 |
| 3,615,543 | A | * | 10/1971 | Rosenoff ...................... 430/217 |
| 3,654,928 | A | | 4/1972 | Duchane |
| 3,719,503 | A | * | 3/1973 | Podlas .......................... 426/573 |
| 3,859,125 | A | * | 1/1975 | Miller et al. .................. 428/511 |
| 3,886,112 | A | | 5/1975 | Watson et al. |
| 4,136,145 | A | * | 1/1979 | Fuchs et al. ................... 264/164 |
| 4,191,574 | A | * | 3/1980 | Endo et al. .................... 430/387 |
| 4,258,849 | A | | 3/1981 | Miller |

(Continued)

FOREIGN PATENT DOCUMENTS

| | | |
|---|---|---|
| CA | 2 042 700 A1 | 11/1991 |
| EP | 0075419 A2 | 3/1983 |

(Continued)

OTHER PUBLICATIONS

Torrado et al. International Journal of Pharmaceutics 166 (1998) 55-63.*

(Continued)

*Primary Examiner* — Kortney L Klinkel
*Assistant Examiner* — Nicole Babson
(74) *Attorney, Agent, or Firm* — Marshall, Gerstein & Borun LLP (57) ABSTRACT

Water-soluble articles such as films, which can be made resistant to contact with small amounts of water, and methods of making the same are disclosed. The water-soluble article is formed from a water-soluble film-forming composition, such as polyvinyl alcohol, and includes a salt that is distributed more closely to at least one of the surfaces than throughout its thickness.

25 Claims, 1 Drawing Sheet

(56) References Cited

U.S. PATENT DOCUMENTS

| | | | |
|---|---|---|---|
| 4,333,736 A * | 6/1982 | Shachar | 23/295 S |
| 4,532,063 A | 7/1985 | Gueldenzopf | |
| 4,777,089 A * | 10/1988 | Takizawa et al. | 428/402.22 |
| 5,151,193 A | 9/1992 | Grobe et al. | |
| 5,252,332 A | 10/1993 | Goldstein | |
| 5,272,191 A | 12/1993 | Ibrahim et al. | |
| 5,286,300 A * | 2/1994 | Hnatin et al. | 134/2 |
| 5,420,015 A * | 5/1995 | Wuerch | 435/12 |
| 5,429,874 A * | 7/1995 | VanPutte | 428/522 |
| 5,439,745 A | 8/1995 | Ohba et al. | |
| 5,509,913 A | 4/1996 | Yeo | |
| 5,547,662 A * | 8/1996 | Khan et al. | 424/78.03 |
| 5,599,767 A * | 2/1997 | Lew et al. | 504/206 |
| 5,616,621 A * | 4/1997 | Popli et al. | 514/772.4 |
| 5,645,972 A * | 7/1997 | Jonkheere | 430/231 |
| 5,849,153 A * | 12/1998 | Ishino et al. | 162/135 |
| 6,335,102 B1 * | 1/2002 | Tsubaki et al. | 428/513 |
| 6,433,245 B1 | 8/2002 | Bjorkquist et al. | |
| 6,509,072 B2 * | 1/2003 | Bening et al. | 428/35.4 |
| 6,660,704 B1 | 12/2003 | Waschenbach et al. | |
| 6,723,430 B2 * | 4/2004 | Kurata et al. | 428/411.1 |
| 6,946,501 B2 * | 9/2005 | Kochvar et al. | 523/210 |
| 6,956,070 B2 | 10/2005 | Fujiwara et al. | |
| 7,335,377 B2 * | 2/2008 | Stern et al. | 424/447 |
| 2002/0161088 A1 * | 10/2002 | Kochvar et al. | 524/379 |
| 2003/0100461 A1 | 5/2003 | Catlin et al. | |
| 2004/0030034 A1 | 2/2004 | Chang et al. | |
| 2006/0216424 A1 | 9/2006 | Maurer et al. | |
| 2008/0020220 A1 | 1/2008 | Maurer et al. | |
| 2008/0146481 A1 | 6/2008 | Brown et al. | |

FOREIGN PATENT DOCUMENTS

| | | | |
|---|---|---|---|
| EP | 0 457 600 A2 | 11/1991 | |
| EP | 1158016 A2 | 11/2001 | |
| EP | 1 180 536 A1 | 2/2002 | |
| EP | 1251147 A1 | 10/2002 | |
| EP | 1 314 653 A1 | 5/2003 | |
| JP | 51-13868 | 7/1974 | |
| JP | 01-029438 A | 1/1989 | |
| JP | H08-269101 * | 10/1996 | C08B 11/08 |
| JP | 2002-241797 A | 8/2002 | |
| JP | 2002-241799 A | 8/2002 | |
| JP | 2003-171521 A | 6/2003 | |
| WO | WO-00/02980 A2 | 1/2000 | |
| WO | WO-00/55068 A1 | 9/2000 | |
| WO | WO-02/26896 A2 | 4/2002 | |
| WO | WO-03/076513 A1 | 9/2003 | |
| WO | WO-2004/031271 A2 | 4/2004 | |
| WO | WO-2005/097966 A1 | 10/2005 | |
| WO | WO-2006/078897 A1 | 7/2006 | |

OTHER PUBLICATIONS

Packet. Encarta World English Dictionary [North American Edition]. http://encarta.msn.com/encnet/features/dictionary/DictionaryResults.aspx?refid=1861722937. Accessed Jul. 28, 2008.*
U.S. Appl. No. 11/871,608, filed Oct. 2007, Friedrich Steven.*
Nonfinal Office Action, U.S. Appl. No. 11/336,273, mail date Mar. 18, 2008.
Nonfinal Office Action, U.S. Appl. No. 11/336,507, mail date Mar. 24, 2008.
Final Office Action, U.S. Appl. No. 11/336,273, mail date Sep. 3, 2008.
Nonfinal Office Action, U.S. Appl. No. 11/336,507, mail date Jul. 10, 2009.
Final Office action, U.S. Appl. No. 11/336,507, mail date Mar. 17, 2010.
Nonfinal Office Action, U.S. Appl. No. 11/336,507, mail date Nov. 12, 2010.
Nonfinal Office Action, U.S. Appl. No. 11/336,507, mail date Jun. 14, 2011.
Nonfinal Office Action, U.S. Appl. No. 11/336,273, mail date Aug. 23, 2011.
Antiblocks—"The Basics," Technical Service Report, Ampacet, believed to be publicly available at least as of Jun. 14, 2005.
Pritchard, Plastic Additives, Rapra Market Report, 2005, Rapra Technology Limited, Shrewsbury, UK.
Murphy, Additives for Plastics Handbook, 2001, p. 215-218, Second edition, Elsevier Advanced Technology, Oxford, UK.
Rothon, Particulate Fillers for Polymers, Rapra Review Reports, 2002, p. 27, vol. 12, No. 9.
Nonfinal Office Action for U.S. Appl. No. 11/336,273, dated Jan. 10, 2012.
Nonfinal Office Action for U.S. Appl. No. 11/336,507, dated Nov. 22, 2011.
Final Office Action for U.S. Appl. No. 11/983,999, dated Jan. 26, 2009.
Nonfinal Office Action for U.S. Appl. No. 11/983,999, dated May 13, 2008.
Non-final office action, U.S. Appl. No. 11/336,273, dated Aug. 23, 2011.
Non-final office action, U.S. Appl. No. 11/336,273, dated Jan. 10, 2012.
Non-final office action, U.S. Appl. No. 11/336,273, dated May 17, 2012.
Non-final office action, U.S. Appl. No. 11/336,273, dated Nov. 21, 2012.
Non-final office action, U.S. Appl. No. 11/336,507, dated Nov. 22, 2011.
Non-final office action, U.S. Appl. No. 11/336,507, dated Oct. 10, 2012.
Final office action, U.S. Appl. No. 11/336,507, dated Feb. 27, 2013.
Communication of Further Notices of Opposition issued to Patent Group on Jul. 14, 2010.
Communication of Further Notices of Opposition issued to Reckitt Benckiser on Jul. 14, 2010.
Communication of Notices of Opposition issued on Jul. 14, 2010.
Communication of Notices of Opposition issued on Jun. 10, 2010.
FAO Corporate Document Repository, "Talc," (1997).
Grounds in Support of Appeal filed by Gill Jennings & Every LLP on Apr. 9, 2013.
Interlocutory Decision in Opposition Proceedings issued on Nov. 30, 2012.
Marten, "Vinyl Alcohol Polymers," *Encyclopedia of Polymer Science and Technology*, 8:399-437 (2002).
Notice of Appeal filed by Gill Jennings & Every LLP on Feb. 11, 2013.
Notice of Appeal filed by Reckitt Benckiser on Jan. 29, 2013.
Nutting, "Effect of Electrolytes on the Viscosity of Potato Starch Pastes," Eastern Regional Research Laboratory (1952).
Reply filed by Reckitt Benckiser on Aug. 23, 2012.
Reply to Grounds of Appeal filed by Patent Group on Aug. 15, 2013.
Reply to Grounds of Appeal filed by Reckitt Benckiser on Aug. 7, 2013.
Response filed by Gill Jennings & Every LLP on Oct. 16, 2012.
Response filed by Patent Group on Jun. 4, 2010.
Response to Communication filed by Gill Jennings & Every LLP on Mar. 7, 2011.
Response to Summons to Attend Oral Proceedings filed by Gill Jennings & Every LLP on Aug. 23, 2012.
Statement of Grounds of Appeal filed by Reckitt Benckiser on Apr. 10, 2013.
Statement of Grounds of Opposition—Facts and Arguments for Application No. EP 06718884.7, filed Jun. 4, 2010.
Submission of Opponent II filed by Patent Group on Aug. 23, 2012.
Summary of Facts and Submissions for Application No. EP 06718884.7, filed on Nov. 30, 2012.
Wikipedia, "Solubility Table," (2013).
Wikipedia, "Talc," (2007). Retrieved from the Internet: URL:http://en.wikipedia.org/wiki/Talc.

* cited by examiner

WATER-SOLUBLE FILM ARTICLE HAVING SALT LAYER, AND METHOD OF MAKING THE SAME

CROSS-REFERENCE TO RELATED APPLICATIONS

The benefit under 35 U.S.C. §119(e) of each of U.S. Provisional Patent Application Ser. Nos. 60/646,432 and 60/646,454 filed Jan. 22, 2005, is hereby claimed, and their disclosures are incorporated herein by reference.

BACKGROUND

1. Field

The disclosure relates generally to a water-soluble film article having a salt layer, and to methods of making the same. More particularly, the disclosure relates to a water-soluble film article that includes a salt layer bound with carboxymethyl cellulose to a water soluble film layer that includes polyvinyl alcohol. In preferred embodiments, the article retains desirable film barrier characteristics and handling ability after contact with small amounts of water, and water solubility with contact with typically large amounts of water.

2. Brief Description of Related Technology

Water-soluble films are gaining wider acceptance for use as packaging materials. Packaging materials include, for example, films, sheets, blown or molded hollow bodies (i.e., sachets, pouches, and tablets), bottles, receptacles and the like. Often water-soluble films, when used in the preparation of certain types of these articles, such as sachets and pouches, leak and/or become sticky when exposed to small amounts of liquid water contamination or high humidity, which can make them unsuitable for usage in the packaging and preservation of the compositions contained therein.

The most common consumer complaints for water-soluble pouches are linked to unwanted pouch dissolution when accidentally exposed to water, such as when water gets inside the outer packaging in which the pouches are sold and stored after purchase, from wet hands, high humidity, leaking sinks or pipes during storage, and the like. This can cause the water-soluble pouches to leak prior to use and/or to stick together. The second most frequent complaint is that of the water-soluble pouch failing to fully dissolve upon use. Thus, there remains an unmet need for water-soluble films and pouches that can resist dissolution and/or leakage after exposure to small amounts of water, and yet which can subsequently dissolve very quickly when immersed in an aqueous solution, such as rinse and/or wash water.

It has been known since the 1960s that certain salts, when added to polyvinyl alcohol (PVOH) solutions, can cause the PVOH to precipitate. These salts have generally been regarded as being useful for solidifying aqueous PVOH. Another disclosure of the use of salts in water soluble films is in U.S. Pat. No. 5,429,874 (Jul. 4, 1995), incorporated herein by reference. The '874 patent is directed to a water soluble film suitable for packaging caustic chemicals that has an outer layer of a water soluble polymeric material, and an inner layer of polymeric material which is compatible with the contents of a package made from the film. An intermediate layer can optionally be included to contribute to the tensile strength, bulk, abuse resistance, or some other property of the film. Water soluble fillers such as salt can optionally be added to one or more of the polymeric materials, prior to or during extrusion of the film, to improve the processability of the film or its rate of dissolution in water, or to add a pigment to the film.

It is known that when untreated pouch surfaces are exposed to droplets of water, these untreated pouch surfaces tend to dissolve and/or leak.

SUMMARY

One aspect of the disclosure provides an article including a water-soluble film, including a first layer including a water-soluble polymer including polyvinyl alcohol, and a second layer including a salt, the salt layer bound to the first layer with a binder including carboxymethyl cellulose.

Another aspect of the disclosure provides a method of making an article, including the steps of providing a water-soluble substrate including a water-soluble polymer, forming a layer including a salt and a binder including carboxymethyl cellulose from an aqueous solution including the salt and the binder, and binding the substrate and the layer including the salt to each other with the binder.

Further aspects and advantages will be apparent to those of ordinary skill in the art from a review of the following detailed description, taken in conjunction with the drawings. While the article and method are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

For further facilitating the understanding of the present invention, two drawing figures are appended hereto, wherein.

DETAILED DESCRIPTION

It is known that when untreated pouch surfaces are exposed to droplets of water, these untreated pouch surfaces tend to dissolve and/or leak. However, it was surprisingly found that when a $Na_2SO_4$ solution is applied to the outside surface of a PVOH pouch, and the outside surface of the pouch is exposed to small amounts of water, the treated pouch does not substantially dissolve and/or leak. Rather, when the treated pouch is exposed to small amounts of water, it exhibits reduced leakage and increased resistance to pouch-to-pouch stickiness.

By adding particular salts to the outside surface of a water-soluble (especially polyvinyl alcohol) film, resistance to exposure from small amounts water (e.g., wet hands, droplets) can be achieved while not appreciably affecting the water-soluble pouch dissolution profile when the product is immersed in an aqueous solution (e.g. water bath). Incorporating the salt into the outermost part of the water-soluble film can be achieved in a variety of ways that includes conventional powdering, coating, casting, or other methods used in the production of films. The salt concentration can be adjusted to achieve the desired dissolution properties and to optimize pouch aesthetics. The water-soluble film described herein can be used in the production of any pouched product, such as for example, pouches containing: laundry detergent compositions, automatic dishwashing detergent compositions, hard surface cleaners, fabric enhancers and/or fabric softeners, and new product forms where contact with small amounts of water could create premature pouch dissolution, unwanted pouch leakage and/or undesirable pouch-to-pouch stickiness.

There are numerous non-limiting embodiments of the water-soluble film and articles described herein. In one class of embodiments, the article is a water-soluble film, and more preferably a water-soluble film that is resistant to contact with small amounts of water. The water-soluble film is also preferably substantially water-soluble when immersed in water. Other embodiments include containers, such as, but not limited to, pouches, packets, and bags, made from the water-soluble film described herein. The surface of the water-soluble film having the salt bound thereto preferably is disposed as an outside surface of the article. In one non-limiting embodiment, the article is a container holding a unit dose of a composition. The composition can be one suitable for use in laundry, hard surface cleaning, hand dishwashing, automatic dishwashing, fabric enhancement (e.g, softeners, brighteners, etc.), and any other application suitable for use with water-soluble films, especially those which are susceptible to contact by small amounts of water prior to use.

There are numerous non-limiting embodiments of the method of making the water-soluble film and articles described herein. In one embodiment, the method includes providing a water-soluble film and binding a salt to at least one of the surfaces of the film with a binder including carboxymethyl cellulose. The salt can be bound in a number of different manners. In one version of this embodiment, the salt is bound by applying an aqueous solution including the salt and the binder to the substrate water-soluble film. In another version of this embodiment, the salt is provided in the form of a layer including the binder, and an aqueous solution of the water-soluble polymer is applied over the layer of salt and binder to form a film. The water-soluble film substrate and layer with salt and binder can also be separately formed and bound together by contact and pre-wetting of one or both of the contact surfaces. Numerous other alternatives will be apparent to a person of ordinary skill in the art.

As used herein, the term "water-soluble" not only refers to a film structure which is totally water-soluble, but also includes films which are substantially water-soluble but have material(s) in the water-soluble film structure which are not water-soluble; films with materials which are water-soluble only at relatively high water temperatures or only under limited pH conditions; and films which include some portion of water-insoluble material, such as a relatively thin layer of water-insoluble material.

As used herein, the term "resistant to contact" (or "resistant to solubility") refers to water-soluble films that have a reduction or elimination in areas thereof that prematurely dissolve when contacted by small amounts of water. For example, packages, such as pouches, made from a water-soluble film that is resistant to solubility will have a reduced tendency to leak or stick together after being contacted by small amounts of water.

As used herein, the term "small amounts of water" refers to amounts of water that are less than sufficient to fully immerse the film or article, such as water droplets and relatively high humidity.

Unless otherwise stated, all percentages set forth herein are by weight.

Water-Soluble Film

Figure 1:
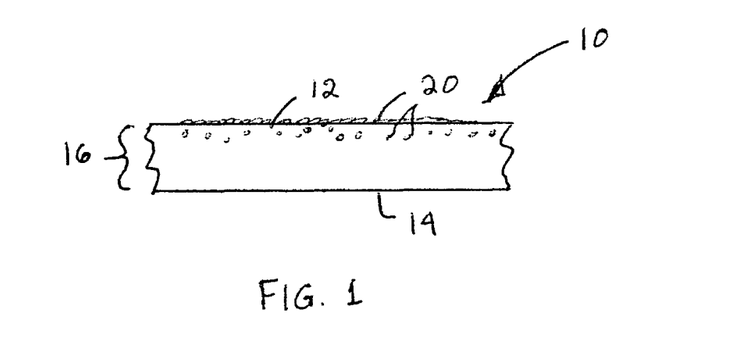
FIG. 1 is a fragmented schematic side view of a portion of a film having a salt disposed on one of the outside surfaces of the same.

FIG. 1 shows one non-limiting embodiment of a water-soluble film 10. The water-soluble film 10 has a first surface 12, a second surface 14, and a thickness 16 between the first surface 12 and the second surface 14. In this embodiment, the water-soluble film 10 includes a water-soluble film-forming composition and a salt 20. The salt 20 is distributed more closely to at least one of the first and second surfaces than throughout the thickness 16 of the water-soluble film 10. For purposes of illustration, the salt 20 is shown in the drawings in the form of discrete particles, or a layer of particles. It should be understood, however, that in some embodiments (such as the embodiment shown in FIG. 2 in which the salt is incorporated into the film-forming composition, discussed below) although the salt 20 is shown as being in the form of particles, the salt 20 can, alternatively, be a part of a homogeneous film layer or layers, and the salt can no longer include identifiable particles.

In some embodiments, the salt 20 can be distributed relatively uniformly on or adjacent to, at least one of the surfaces of the water-soluble film 10. In other embodiments, the salt 20 can be distributed randomly on or adjacent to, at least one of the surfaces of the water-soluble film 10. In some embodiments, the thickness 16 of the film 10 can be substantially free of salt 20. In other embodiments, some salt 20 (a minority of the total amount of salt) can also be distributed within the thickness 16 of the water-soluble film 10. Such a minority of the salt can be distributed randomly within the thickness 16 of the film, or, alternatively, in a regular manner therein. In other embodiments, the salt 20 can be distributed in the form of a gradient whereby a higher concentration of salt 20 is found on, or adjacent to, at least one of the surfaces of the water-soluble film 10 than throughout the thickness 16 of the water-soluble film 10.

To provide desired protection from resistance to accidental exposure to small amounts of water, the salt 20 can be distributed more closely to a surface of the water-soluble film 10 that is more likely to be exposed to such water (e.g., the surface that will lie on the outside of a product made from the water-soluble film 10). The salt 20 can be disposed in any one or more of the following locations on the water-soluble film 10: on the first surface 12 of the water-soluble film 10; on the second surface 14 of the water-soluble film 10; within the water-soluble film 10 between the first surface 12 and the second surface 14 in a location that is distributed more closely to at least one surface, such as nearer the first surface 12 and/or the second surface 14; or incorporated into an outer layer of a multi-layer water-soluble film.

The water-soluble film 10 can include a number of suitable water-soluble materials. In one embodiment, the water-soluble film includes a water-soluble film-forming composition including at least some polyvinyl alcohol (a.k.a. "PVA" and "PVOH") and a salt. In some embodiments, the water-soluble film 10 can be comprised substantially entirely of PVOH, one or more salts, and one or more additive ingredients. In other embodiments, the water-soluble film 10 can consist essentially of PVOH, one or more salts, and one or more additive ingredients. In other embodiments, however, the water-soluble film 10 can include a mixture of PVOH and other suitable water-soluble or water dispersible materials, one or more salts, and one or more additive ingredients. Suitable water-soluble materials include, but are not limited to polymers, copolymers and derivatives thereof.

If polyvinyl alcohol or a copolymer thereof is used, then the PVOH can be partially or fully hydrolyzed. Polyvinyl alcohol (PVOH) is a synthetic resin generally prepared by the alcoholysis, usually termed hydrolysis or saponification, of polyvinyl acetate.

Fully hydrolyzed PVOH, where virtually all the acetate groups have been converted to alcohol groups (e.g., 98% or greater degree of hydrolysis), is a strongly hydrogen-bonded, highly crystalline polymer which dissolves only in hot water—e.g., rapid dissolution at temperatures of about 60° C. and greater.

If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—e.g., rapid dissolution at temperatures of about 10° C. and greater.

Both fully and partially hydrolyzed PVOH types are commonly referred to as PVOH homopolymers although the partially hydrolyzed type is technically a vinyl alcohol-vinyl acetate copolymer.

An intermediate cold/hot water soluble film can include, for example, blends of partially-hydrolyzed PVOH (e.g., with degrees of hydrolysis of about 94% to about 98%), and is readily soluble only in warm water—e.g., rapid dissolution at temperatures of about 40° C. and greater.

The term PVOH copolymer is generally used to describe polymers that are derived by the hydrolysis of a copolymer of a vinyl ester, typically vinyl acetate, and another monomer. PVOH copolymers can be tailored to desired film characteristics by varying the kind and quantity of copolymerized monomers. Examples of copolymerizations are those of vinyl acetate with a carboxylic acid or with an ester of a carboxylic acid. Again, if the hydrolysis of acetate groups in these copolymers is only partial, then the resulting polymer could also be described as a PVOH terpolymer—having vinyl acetate, vinyl alcohol, and carboxylic acid groups—although it is commonly referred to as a copolymer.

It is known in the art that many PVOH copolymers, because of their structure, can be much more rapidly soluble in cold water than the partially hydrolyzed type of PVOH homopolymers. Such copolymers have therefore found considerable utility in the fabrication of packaging films for the unit dose presentation of various liquid and powdered products including, but not limited to, agrochemicals, household and industrial cleaning chemicals, laundry detergents, water treatment chemicals, and the like.

Suitable water-soluble film materials that can be used in addition to PVOH include, but are not limited to: polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethyl cellulose salts (e.g., sodium carboxymethyl cellulose, calcium carboxymethyl cellulose), dextrin, ethylcellulose, ethylhydryoxyethyl cellulose (EHEC), hydroxyethyl cellulose (HEC), hydroxyethylmethyl cellulose (HEMC), hydroxypropyl cellulose (HPC), hydroxypropyl methyl cellulose (HPMC), maltodextrin, methyl cellulose (MC), polymethacrylates, PVOH copolymers, and mixtures thereof.

Mixtures of polymers can be beneficial to control the mechanical and/or dissolution properties of the film, depending on the application thereof and the required needs. Suitable mixtures include, for example, mixtures wherein one polymer has a higher water-solubility than another polymer, and/or one polymer has a higher mechanical strength than another polymer and/or mixtures of polymers having different weight average molecular weights. Also suitable for use in the film described herein are polymer blend compositions, for example including hydrolytically degradable and water-soluble polymer blends such as polylactide and polyvinyl alcohol, obtained by mixing polylactide and polyvinyl alcohol, typically in a range of about 1-35% by weight polylactide and about 65% to 99% by weight polyvinyl alcohol.

Commercially available film materials can also be modified by adding salt thereto as described herein. Suitable commercially available film materials that can be modified by adding salt thereto as described herein, include PVOH films known as MONOSOL M8630 and M8630K films, available from MonoSol, LLC of Portage, Ind., U.S.A., and PVOH films of corresponding solubility and deformability characteristics. Some MonoSol water-soluble films are described in U.S. Pat. No. 3,374,195 (Mar. 19, 1968) and U.S. Pat. No. 3,413,229 (Nov. 26, 1968), both incorporated herein by reference. Other films suitable for being modified for use herein include: PT film or the K-series of films available from Aicello Chemical Co., Ltd., Aichi, Japan; VF-HP film available from Kuraray Co., Ltd., Tokyo, Japan; and HI-SELON film available from The Nippon Synthetic Chemical Industry Co., Ltd., Osaka, Japan. One particular Nippon Synthetic Chemical Industry Co. water-soluble film is described in European Patent Publication EP 1158016 A2 (Nov. 28, 2001), incorporated herein by reference.

The water-soluble film 10 can include any suitably film-forming amount of PVOH and other suitable water-soluble or water dispersible materials. When the water-soluble film 10, or the water-soluble film-forming composition, is described herein as including PVOH and other water-soluble or water dispersible materials, this refers to water-soluble or water dispersible polymeric material, including polymers, copolymers, terpolymers, and water-soluble film materials described above (which may be referred to herein as the "primary film material" (or materials)), and does not include salt, plasticizer, water, or other additive ingredients. In some embodiments, the water-soluble film 10 includes from about 50% to about 95% of primary film materials, such as PVOH and other suitable water-soluble or water dispersible materials (on a dry basis in the finished film).

The film 10 can include any suitable salt 20. Suitable salts 20 can include organic or inorganic electrolytes. Suitable salts 20 can include a cation or combinations of cations selected from the following group: aluminum, ammonium, antimony, barium, bismuth, cadmium, calcium, cesium, copper, iron, lithium, magnesium, nickel, potassium, rubidium, silver, sodium, strontium, zinc and zirconium; and an anion or combination of anions selected from the following group: acetate, aluminum sulfate, azide, bicarbonate, bisulfite, borohydride, borooxalate, bromate, bromide, carbonate, chloride, chlorite, chromate, cyanate, cyanide, dichromate, disilicate, dithionate, ferricyanide, ferrocyanate, ferrocyanide, fluoride, fluoroantimonate, fluoroborate, fluorophosphate, fluorosulfonate, flurosilicate, hydrogen carbonate, hydrogen sulfate, hydrogen sulfite, hydrogencyanide, hydrogenophosphate, hydrogensulfate, hydrosulfite, hydroxide, hydroxostannate, hypochlorite, hyponitrite, hypophosphite, iodate, iodide, manganate, meta-aluminate, metaborate, metaperiodate, metasilicate, mixed halides, molybdate, nitrate, nitrite, orthophosphate, orthophosphite, orthosilicate, oxalate, oxalatoferrate, oxide, perborate, perchlorate, permanganate, peroxide, peroxydisulfate, phosphate, polybromide, polychloride, polyfluoride, polyiodide, polyphosphate, polysulfide, pyrosulfate, pyrosulfite, sesqui-carbonate, silicate, stannate, sulfamate, sulfate, sulfide, sulfite, thiocyanaate or thiosulfate.

Other suitable salts include cations such as substituted ammonium ions $R_4N$ (with R=hydrogen or $C_{1-6}$ alkyl, substituted or unsubstituted). Other suitable types of anions include carboxylates, formates, citrates, maleates, tartrates, and the like. Suitable salts can include $C_{1-9}$ alkyl carboxylic acids; polymeric carboxylates (polyacrylates, polymaleates); short chain ($C_{1-9}$) alkylphosphates, alkylphosphonates; and short chain ($C_{1-9}$) alkyl sulfates and alkylsulphonates.

FIG. 1 shows that the salt 20 can be disposed on at least one of the surfaces of the film 10, such as surface 12. FIG. 1 also shows that the salt 20 can be incorporated into the film 10. The salt 20 can be distributed in any suitable thickness on or within the film 10, or both. The thickness of the salt 20 (or more specifically, the thickness of the "salt distribution") may be expressed in terms that are relative to the total film thickness 16. The total film thickness 16 can, for example, range from about 0.5 to 5 mils (or from about 12 or 13 microns to about 125 microns). In other embodiments, however, the total film thickness can be less than 0.5 mils (12.7 microns), or greater than 5 mils (127 microns). In some embodiments, the thickness of the salt distribution can range from about 1% to about 80% of the total film thickness. If the salt 20 is distributed within the film 10, the salt 20 can be located in any suitable location within the film. For example, the salt 20 can be located within from about 1% to about 50%, from about 1% to about 40%, from about 1% to about 30%, from about 1% to about 20%, from about 1% to about 15% of at least one of the surfaces of the water-soluble film 110. It should be understood that the percentages provided herein refer to where the salt 20 is primarily distributed, and that it is also possible that small amounts of salt can be distributed elsewhere within the film 10.

To make a film 10 with the salt 20 distributed as shown in FIG. 1, the salt 20 can be applied to a film, or incorporated into the film 10 in a number of different manners. Methods for making the film are described in detail in the following section. However, some mention will be made here of some of these methods as they relate to the amount of salt 20 that can be applied to a film, or incorporated into the film 10. If the salt 20 is applied to a surface of the film 10 in powder form, then it can be applied until an excess of powder (i.e., an amount that would not remain on the film) is formed on the surface of the film 10. In other embodiments, the salt 20 can be incorporated into a solution that is applied to the surface of a film. A suitable salt solution for the water-soluble film-forming composition can include any suitable molar concentration of salt. Suitable molar concentrations of a salt in solution can include, but are not limited to: from about 0.01 M to about 10 M, from about 0.1 M to about 5 M, and alternatively from about 0.5M to about 4M salt in an aqueous solution. Suitable molar concentrations of a salt in solution can be adjusted differently for different salts. For example, a molar concentration as low as about 0.25 M can be used for sodium sulfate, and a molar concentration as low as about 0.03 can be used for some Al salts. In other embodiments, the salt 20 can be incorporated directly into any suitable water-soluble film-forming composition by mixing a suitable salt into the film-forming composition (e.g. PVOH composition, which can be an aqueous composition) in any suitable manner as described in the following section. In certain non-limiting embodiments, an effective amount of a salt can be defined in the following amounts: from about 0.1% to about 50%; from about 0.5% or about 1% to about 15, 20, or 25%; and, alternatively from about 0.5% to about 15% by weight of the film (on a dry basis after the film is formed).

In a preferred embodiment, a carboxymethyl cellulose polymer (e.g., carboxymethyl cellulose sodium) will be used to bind a salt (e.g., sodium sulfate) to another layer of water-soluble composition, such as a PVOH-containing film. Use of carboxymethyl cellulose permits much higher salt loading in solution, as compared to PVOH or other water-soluble polymers which themselves would salt out under high salt concentrations. The use of carboxymethyl cellulose also permits good adhesion of salt to a substrate polymer layer and uniform distribution on the surface of a substrate layer. Thus, a more efficient and effective salt-containing layer can be provided. To a lesser extent, HPMC, HEMC, HPC, EHEC, MC, and HEC are also preferred. To a lesser extent, natural gums such as gum arabic are also preferred.

It was also observed that the use of carboxymethyl cellulose to the salt solution inhibited salt crystal growth and size, which can be beneficial for article appearance and consumer acceptance in some embodiments. For example, in certain embodiments the salt crystals will preferably not be visible to the naked eye. An average salt crystal size of less than about 10 microns, preferably less than about 1 micron, is contemplated.

In particular, carboxymethyl cellulose polymers having a high degree of substitution (average number of the three hydroxyl groups in the anhydroglucose unit of cellulose which have reacted to become carboxymethlated), for example least 0.4, such as 0.7, 0.9, 1.2, or 1.5, can tolerate higher salt loading without salting out of the polymer and, thus, are preferred.

Likewise, carboxymethyl cellulose polymers with lower molecular weights are also more tolerant to high salt loading and, thus, are preferred. Solution viscosity can be used to approximate molecular weight. Accordingly, a carboxymethyl cellulose having a 2 wt. % solution viscosity at 23° C. of less than 30,000 cps is preferred, more preferably the following values or less: 20,000 cps, 15,000 cps, 10,000 cps, 5,000, and 2,000 cps. Exemplary values include 300 cps, 350 cps, 600 cps, and 2,000 cps (all values of a 2 wt. % solution viscosity at 23° C.). Suitable carboxymethyl cellulose polymers are available from Hercules, Inc., of Wilmington, Delaware, under the BLANOSE trade name, for example. Other carboxymethyl cellulose polymers are available under the STAFLO trade name from Akzo Nobel of Arnhem, The Netherlands, and under the trade name CELLOGEN from Montello, Inc. of Tulsa, Oklahoma as distributor for Dai-Ichi Kogyo Seiyaku Co., Ltd. of Japan.

When the salt is incorporated directly into a solution including a water-soluble, film-forming composition that includes a carboxymethyl cellulose for binding the salt to a substrate water-soluble layer, then the salt concentration in solution can be much higher, such as at least 5%, 10%, 20%, 30%, or 40% by weight of the solution. Excessively high salt levels can lead to practical processing difficulties, such as buildup of solid salt in equipment, and excessively low salt concentrations require evaporation of more water to form the resulting film. The salt concentration is preferably 40 wt. % or less. The salt concentration is preferably at least 5%.

The binder can comprise 40 wt. % or less of the second layer. The level of binder, such as carboxymethyl cellulose binder, used in the aqueous solution for coating a substrate can be relatively low, such as 25 wt. % or less, preferably 10 wt. % or less, such as about 0.5 wt. % to about 5 wt. % for a binder such as carboxymethyl cellulose. Thus, for example about 5-20% salt can be used with about 1% to 2% carboxymethyl cellulose, both based on the weight of the solution. For example, ratios of carboxymethyl cellulose to salt can include 1:1.5, 1:2.5, 1:5, 1:10, and 1:20.

Thus, the dry basis level of salt in such an embodiment can be greater than 50%, and at least 70% or 80% or 90% by weight, and as much as about 95% by weight, based on the dry weight of the coating solution. The foregoing amounts of salt and carboxymethyl cellulose are also specifically contemplated for use with sodium sulfate salt and also with a substrate film that contains or consists essentially of PVOH.

Other salts which, at similar concentrations, will provide moisture resistance on a PVOH film include ammonium sulfate, zinc sulfate, and tribasic sodium phosphate, for example.

When the salt is incorporated directly into a solution including a water-soluble, film-forming composition that includes a carboxymethyl cellulose for binding the salt to a substrate water-soluble layer, then the solution preferably includes a surfactant, such as a nonionic surfactant, as described below. The solution can also include a liquid less volatile than water to optimize the drying rate with various application methods. Such a slow-drying liquid can include, for example, glycols, glycol ethers, polyols, polyol ethers, and combinations thereof. Specific examples include glycerin and propylene glycol. Use of a slow-drying liquid can help improve film uniformity, but also may lead to plasticization of the resulting film and/or film layer and potential tackiness of the salt layer; accordingly when a slow-drying liquid is used low levels (e.g., 5 wt. % to 25 wt. % based on the weight of the coating) are preferred.

The aqueous solution including a salt and a binder preferably consists essentially of a salt, a binder, water, and optionally one or both of a surfactant and a slow-drying liquid.

If a film-forming composition is being modified to form a water-soluble film according to the present invention, the salt can replace an equivalent amount, by weight, of PVOH (or other primary film material) in the composition.

The water-soluble film-forming composition and the water-soluble film 10 formed therefrom can also include one or more additive or adjunct ingredients. For example, the water-soluble film-forming composition and the water-soluble film 10 can contain: water, plasticizers, lubricants, release agents, fillers, extenders, anti-blocking agents, detackifying agents, antifoams, or other functional ingredients. The latter can, in the case of articles containing compositions for washing, include, but are not limited to, functional detergent additives to be delivered to the wash water, for example organic polymeric dispersants, or other detergent additives.

The water-soluble film 10 can, thus, include water, or other volatile ingredients. Water or other volatile ingredients can be present in the film in any suitable amount. Suitable amounts include, but are not limited to in a range of from about 1-20%, by weight of the water-soluble film after the film has been formed and preconditioned for 24 hours at 21° C. and 50% relative humidity.

The water-soluble film 10, as noted above, can include a plasticizer. Suitable plasticizers include, but are not limited to: glycerin (glycerol, 1,2,3-propanetriol), diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof.

In one non-limiting embodiment, the plasticizer can include a combination of hydroxypropyl glycerine and a low molecular weight polyethylene glycol with a hot (140° F. (about 49° C.) and cold (75° F. (about 24° C.) water soluble film-forming polyvinyl alcohol such as is described in U.S. Pat. No. 3,374,195 (Mar. 19, 1968), incorporated herein by reference. In certain versions of such an embodiment, the polyvinyl alcohol employed is prepared by replacement of about 80%-95%, or 85%-90%, of the acetate groups of polyvinyl acetate by hydroxyl groups. In these embodiments, the aqueous film-forming composition can include any suitable amount of polyvinyl alcohol (for example, about 20-40%). The polyvinyl alcohol can have a viscosity in 4% aqueous solution at 20° C. of at least about 20 centipoises, or between about 20-45 Cps. The hydroxypropyl glycerine can be 1-methyl-2-hydroxyethyl glyceryl ether where an average of at least about 2.5, or alternatively 3, of the hydroxyl radicals of glycerine are etherified or substituted by the hydroxylpropyl (1-methyl-2-hydroxyethyl) radicals. The polyethylene glycol can have a weight average molecular weight of between about 200-600, or alternatively between about 200-300. In one non-limiting embodiment, the composition contains polyvinyl alcohol and, in percentages by weight of the polyvinyl alcohol content, about 7-17% of hydroxypropyl glycerine, and about 10-20% of polyethylene glycol. The total proportion of the plasticizer combination of hydroxypropyl glycerine and polyethylene glycol can be between about 22-32%. For example, about 12% of hydroxypropyl glycerine and about 15% of polyethylene glycol can be used.

In another embodiment, a plasticizer can include one or more of the following: glycerin, triethyleneglycol, propylene glycol, and trimethylolpropane. The plasticizer can be incorporated in the water-soluble film 10 in any suitable amount including, but not limited to amounts in the range of from about 5% to about 30% by weight, or in the range of from about 12% to about 20% by weight.

Suitable surfactants can include the nonionic, cationic, anionic and zwitteronic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics).

Nonionic surfactants are preferred. For example, a nonionic difunctional block copolymer including poly(ethylene oxide) and poly(propylene oxide) blocks and terminating in primary hydroxyl groups is sold under the designation PLURONIC L-10 by BASF Corporation of Florham Park, N.J. The surfactant can be incorporated in the water-soluble film 10 or a layer thereof in any suitable amount including, but not limited to amounts in the range of from about 0.01% to about 5% by weight, or about 1% to about 3%, or in the range of from about 0.1% to about 0.6% by weight. When used to apply a carboxymethyl cellulose and salt-containing solution for binding to a substrate film, the nonionic surfactant, such as the above-described block copolymer, can be used in an amount of about 0.01 to about 0.5% by weight, or about 0.05% to about 0.3% by weight, for example about 0.2% by weight, based on the weight of the solution.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble film 10 in any suitable amount including, but not limited to amounts within the range of from about 0.02% to about 1.5% by weight, or in the range of from about 0.04% to about 0.15% by weight.

Suitable fillers, extenders, antiblocking agents, and detackifying agents include, but are not limited to: starches, modified starches, crosslinked polyvinylpyrrolidone, crosslinked cellulose, microcrystalline cellulose, silica, metallic oxides, calcium carbonate, talc and mica. Each of the filler, extender, antiblocking agent, and detackifying agent can be present in the water-soluble film 10 in any suitable amount including, but not limited to amounts in the range of from about 0.1% to about 25% by weight, or in the range of from about 1% to about 15% by weight. In the absence of starch, each of the filler, extender, antiblocking agent, detackifying agent can be present in a range of from about 1% to about 5% by weight.

Suitable antifoams include, but are not limited to, those based on polydimethylsiloxanes and hydrocarbon blends. The antifoam can be present in the water-soluble film 10 in any suitable amount including, but not limited to, in the range of from about 0.001% to about 0.5%, or in the range of from about 0.01% to about 0.1% by weight.

The composition is prepared by mixing the materials and agitating the mixture while raising the temperature from about 70° F. (about 21° C.) to 195° F. (about 90° C.) until solution is complete. The film-forming composition can be made into any suitable form (e.g., film or sheets) and can then be subsequently formed into any suitable product (e.g., single—and multiple—compartment pouches, sachets, bags, etc.).

Methods of Making a Water-Soluble Film

There are numerous non-limiting embodiments of the method of making the water-soluble film 10 described herein.

In one embodiment, the method includes providing a previously formed water-soluble film and applying a salt to at least one of the surfaces of the previously formed water-soluble film. The previously formed water-soluble film can be a water-soluble film that is unmodified by having added salt to the composition used to form the film. Such a method can be used to provide salt 20 on the outside surface of the film 10 shown in FIG. 1.

The salt 20 can be applied to the previously formed water-soluble film in a number of different manners. In one non-limiting embodiment, the salt is applied to at least one of the surfaces of the previously formed water-soluble film in the form of a powder (in particles or granules). The salt particles can be of any suitable size. For example, the sodium sulfate powder can have an average particle size of from about 1 micron to about 500 microns; from about 1 micron to about 300 microns, or alternatively, less than or equal to about 150 microns. Several non-limiting examples of suitable size salt particles are those which pass through number 120 and 270 size sieves. The amount of salt added to the previously-formed water-soluble film can be expressed in terms of the amount of salt added onto the film as a percentage of the initial film weight (before the salt is added). The amount of salt that can be added to the film in such an embodiment can be in any suitable range including, but not limited to between about 0.01% and about 50%, or more, or between about 2.5% and about 20%, or between about 2.5% and about 7%, by weight. In such embodiments, greater amounts of salt can be applied to the film since applying salt to the surface of a film will not be as likely to undesirably alter certain properties of the film, especially the mechanical properties of the same, as will incorporating salt into a film-forming composition.

In another non-limiting embodiment of the method, the salt is provided in the form of a solution that is applied onto at least one of the surfaces of the water-soluble film. The solution can be applied to at least one of the surfaces of the water-soluble film in any suitable manner including, but not limited to, by spraying and/or printing the same onto at least one of the surfaces of the water-soluble film. The solution can include a mixture of any suitable amount of salt and water. For example, the solution can include from about a 0.01 M to about a 1.25 M, or greater, solution of salt and water. In one non-limiting embodiment, the solution includes at least a 0.5 M $Na_2SO_4$ solution. Such a solution can be formed by mixing at least 6.6% of $Na_2SO_4$ in water. The film with the salt solution thereon is then allowed to dry, or undergoes a drying process. The concentration of salt in the solution can also be established so that after the film with the salt solution thereon is allowed to dry, or undergoes a drying process, the level of salt in the remaining water is within the above ranges, for example, the salt in the dried coating on the surface of the film can be in a concentration of at least about 0.5 M to about 1.25 M, or more.

These embodiments can also include a step of wetting at least a portion of at least one of the surfaces of the water-soluble film prior to applying a salt to the previously formed water-soluble film. The wetting of the surface of the water-soluble film can be used to at least partially dissolve or solubilize an outer portion of the surface of the film (that is, part of the way into the thickness of the film). The water-soluble film can be at least partially solubilized to any desired depth. Suitable depths include, but are not limited to: from about 1% to about 40% or about 45%, from about 11% to about 30%, from about 1% to about 20%, from about 1% to about 15%, and alternatively, from about 1% to about 10% of the overall film thickness. Salt is then applied to the partially dissolved portion of the surface of the film. This allows the salt to be embedded into an outer portion of the surface of the film, and to become a more permanent part of the film. The wetted surface of the film with the salt embedded into the same is then permitted to dry. Such an embodiment of the method can also include a step of removing at least some of any loose or excess salt remaining on the surface of the water-soluble film after it dries, such as by wiping or dusting the surface of the film.

In another embodiment, the method of making the water-soluble film 10 includes the steps of: (a) providing a water-soluble film-forming composition; (b) adding a salt to the water-soluble film-forming composition; and (c) forming a film from the mixture including the water-soluble film-forming composition with the salt therein. In such an embodiment, including the multi-layer embodiments described below, the salt 20 can be added in any suitable weight percentage. Suitable percentages include, but are not limited to: up to about 20%; less than or equal to about 20%, and from about 1% to about 15%, without adversely affecting the properties of the film 10. The salt 20 can be added to the film-forming composition before or during the process of forming the water-soluble film. It can be desirable in such an embodiment to add the salt during the process of forming the water-soluble film (e.g., such as by adding the salt to a partially formed film, such as a film that has been cast, but not dried) so that the salt will be distributed more closely to at least one of said first and second surfaces than throughout the thickness of said water-soluble film after the film is formed. In order to make such a film, the ingredients described above are combined in the manner described herein, and the water-soluble film 10 is formed using any of the processes available for making films. Suitable films can, for example, be prepared by one or more of the following film, forming methods: coating, laminating, casting, blow molding, and/or extrusion or blow extrusion of the film-forming material.

In another embodiment, the salt can be added to the water-soluble film 10 after the film is formed into an article. For example, if the water-soluble film 10 is used to form a water-soluble pouch that contains a functional composition, the salt can be added to the film on at least a portion of the surface of the water-soluble pouch. This can be done in several different manners. Several non-limiting examples of such a method are described below. Another alternative for such a method is to at least partially immerse, or fully immerse, the article (e.g., the pouches) in a concentrated salt solution.

In another embodiment, the method of making the water-soluble film 10 includes forming a multi-layer water-soluble film. The multi-layer water-soluble film can include two or more layers (e.g., 3, 4, 5 layers, etc.). The term "layer", as used herein, not only encompasses pre-formed layers, but also encompasses coatings. Thus, a coating can also be considered to be a layer, unless indicated otherwise. Consistent with the entire disclosure herein including methods disclosed, the term "layer" includes discrete strata with well-defined interfaces therebetween, as well as strata with diffuse interfaces therebetween. The term "layer" is defined to include sufficient continuity for the intended purpose, accounting for other aspects of the film or article composition (e.g., a water-soluble film layer intended to serve as a containment pouch will be completely continuous in order to prevent leakage, whereas a salt-containing layer need only be sufficiently continuous to serve a desired purpose, such as wet handling characteristics). A layer can be applied in a single step, or multiple application steps can be used to build up a suitable layer.

The multi-layer water-soluble film has at least one layer, preferably an outer layer, that has a salt incorporated therein or distributed thereon. In other embodiments, it is also possible to create a multi-layer film in which the layer that has a salt incorporated therein or distributed thereon includes an inner layer of the multi-layer film. Such multi-layer films can be made in a number of different manners.

As described above, a particularly preferred embodiment includes a substrate layer including PVOH having a salt layer bound thereto with carboxymethyl cellulose. A preferred method for such an embodiment includes the steps of providing a water-soluble film substrate including a water-soluble polymer including polyvinyl alcohol, forming a layer including a salt and a binder including carboxymethyl cellulose from an aqueous solution including the salt and the binder, and binding the substrate and the layer including a salt to each other with the binder. The aqueous solution can be applied in any suitable manner to form the desired salt layer, including, but not limited to, methods such as roll coating and spraying. In one method embodiment, it was found to be desirable to apply an aqueous solution including a salt and a binder to a substrate in a manner such that the amount of water applied in the coating step was on the same order as the amount of water present in the substrate film. For example, for a film about 3 mils (about 76 microns) in thickness, weighing about 98 g/m$^2$, and having about 6 wt. % water (thus, about 5.9 wt. % water), a coating solution of about 78 wt. % water can be applied at a rate of about 6 g/m$^2$ to yield about 4.7 g/m$^2$ water in a coating process step.

Figure 2:
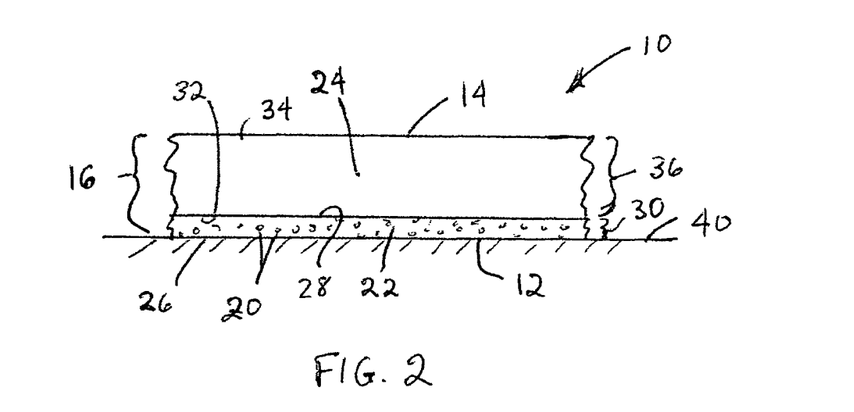
FIG. 2 is a fragmented schematic side view of method of making a water-soluble film having a layer on the outside surface thereof with a salt incorporated into the same.

FIG. 2 shows one non-limiting embodiment of a schematic side view of a method of making a film 10 that has one or more layers that form the surface thereof with a salt incorporated into the same. In the embodiment shown in FIG. 2, the film 10 includes two layers. These will be referred to as first layer 22 and second layer 24. As shown in FIG. 2, the multi-layer water-soluble film 10 is formed with the first layer 22 facing downwardly on a surface, such as a casting surface 40.

The first layer 22 includes a first surface 26, a second surface 28, and has a thickness 30 between the first and second surfaces. The second layer 24 includes a first surface 32, a second surface 34, and has a thickness 36 between the first and second surfaces. The first and second layers 22 and 24 are combined together so that the first surface 32 of the second layer 24 is adjacent to, and joined to, the second surface 28 of the first layer 22. The first surface 26 of the first layer 22 forms the first surface 12 of the multi-layer film 10, and the second surface 34 of the second layer 24 forms the second surface 14 of the multi-layer film 10. The salt 20 is distributed within the thickness 30 of the first layer 22.

The multi-layer film 10 shown in FIG. 2 can be formed in any suitable manner. In one embodiment, the multi-layer film 10 is formed by preparing a first water-soluble film-forming composition that will be used to form the first layer 22. The first water-soluble film-forming composition includes a first concentration of one or more salts 20. The first water-soluble film-forming composition with salt 20 therein is formed into the first film layer 22. The first water-soluble film-forming composition with salt 20 can be formed into the first film layer 22 in any suitable manner. The first film layer 22 can, for example, be formed by one or more of the following film forming methods: casting, blow molding, and/or extrusion or blow extrusion of the film-forming material, or combinations thereof.

In the embodiment shown in FIG. 2, the first film layer 22 is formed by casting the first water-soluble film-forming composition on a suitable casting surface 40. The film-forming composition can be cast when it is at an elevated temperature, or is heated. The film-forming composition can be at any suitable temperature when it is cast. In one non-limiting embodiment the film-forming composition is at a temperature of about 165° F. (about 74° C.) when it is cast. In a full-scale, continuous film-making process, it can be desirable for the film-forming composition to be cast at higher temperatures. The casting surface 40 can include any surface that is suitable for casting such films, and can include belts or drums typically used in the industry for this purpose. To make the film in a laboratory, a piece of glass can be used as the casting surface 40. The first water-soluble film-forming composition can be applied to casting surface 40 in any suitable manner to form the first film layer 22. The first film layer 22 can be formed on the casting surface 40 by forming a single coating or layer on the casting surface 40, or by sequentially coating or layering the first water-soluble film-forming composition to form a film 22 of the desired thickness 30.

The second film layer 24 is formed from the second water-soluble film-forming composition. The second water-soluble film-forming composition includes less salt than the first water-soluble film forming composition, or is substantially, or completely, free of salt. The second film layer 24 is formed by forming a second film from the second water-soluble film-forming composition, and the second film layer 24 is combined with the first film layer 22. The second water-soluble film-forming composition can be formed into the second film layer 24 in any suitable manner. The second film layer 24 can, for example, be formed by one or more of the following film forming methods: casting, blow molding, and/or extrusion or blow extrusion of the film-forming material, or combinations thereof. In the embodiment shown in FIG. 2, the second film layer 24 is formed by coating or casting the second water-soluble film-forming composition onto the first film layer 22.

The combined layers will form a multi-layer film 10 with salt that is distributed more closely to one surface 12 of the water-soluble film 10. In the embodiment shown in FIG. 2, the film layer 22 containing salt 20 is formed before the film layer 24 that contains less salt or is substantially free of salt. In addition, the first film layer 22 containing salt 20 is thinner than the second film layer 24 that contains less salt or is substantially free of salt.

There are a numerous alternative embodiments of the method shown in FIG. 2. These include, but are not limited to the following. The steps of the method can be performed in a number of different orders. For example, the different film-forming compositions can be formed in any order. It is not necessary that the first film-forming composition be prepared before the second film-forming composition. In other embodiments, the film layer containing salt 20 can be formed after and/or on top of the film layer that contains less salt or is substantially free of salt. In other embodiments, the film layer containing salt 20 can be thicker than the film layer that contains less salt or is substantially free of salt.

In other embodiments, a multi-layer film can be prepared with more than two layers. In such a case, the method can further include providing one or more additional water-soluble film-forming compositions. The one or more additional film-forming compositions can include less salt than the first water-soluble film-forming composition, or be substantially free of salt. The method can further include forming one or more additional film layers from the one or more additional water-soluble film-forming compositions wherein the one or more additional film is combined with the second film to form a three or more layer multi-layered film. In alternative versions of such an embodiment, the one or more additional film-forming compositions can include the same percentage of salt, or more salt than the first water-soluble film-forming composition. In such an alternative embodiment, the layers should be combined so that the layer with the highest concentration of salt is more close to, at least one of said first and second surfaces of the multi-layer film than throughout the thickness of the multi-layer water-soluble film.

The layers of the multi-layer films described herein can have any suitable thicknesses, and can include any suitable portion or percentage of the overall film thickness. The layer containing salt can range in thickness from about 1% to about 80% of the total film thickness 16. For example, the first film layer can include from about 1% to about 50%, from about 1% to about 40%, from about 1% to about 30%, from about 1% to about 20%, from about 1% to about 15%, from about 1% to about 10%, and alternatively from about 1% to about 5% of the overall film thickness. Thus, in certain embodiments, the ratio of the thickness of the second layer 24 to the first layer 22 can be greater than 2:1. For example, in one non-limiting embodiment, the overall thickness of the multi-layer film can be about 75 microns, and the first layer 22 can have a thickness of about 10 microns, and the second layer 24 can have a thickness of about 65 microns.

Methods of Making a Water-Soluble Pouch

The water-soluble film 10 described herein can be formed into articles, including but not limited to those in which the water-soluble film is used as a packaging material. Such articles include, but are not limited to water-soluble pouches, sachets, and other containers.

Water-soluble pouches and other such containers that incorporate the water-soluble film 10 described herein can be made in any suitable manner known in the art. The water-soluble film 10 can be provided with improved resistance to solubility either before or after forming the same into the final product. In either case, in certain embodiments it is desirable when making such articles, that the surface 12 of the film 10 on which the salt is distributed (or the surface which is located more closely to the salt contained within the thickness of the film), forms an outer surface of the product.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a film. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a film is placed in the die and open pouches are formed in these molds, which can then be filled, covered with another layer of film, and sealed. In the third process (formation of pouches in molds on the surface of a circular drum), a film is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the film can initially be molded or formed into the shape of an open pouch using thermoforming, vacuum-forming, or both. Thermoforming involves heating the molds and/or the film by applying beat in any known way such as contacting the molds with a heating element, or by blowing hot air or using heating lamps to heat the molds and/or the film. In the case of vacuum-forming, vacuum assistance is employed to help drive the film into the mold. In other embodiments, the two techniques can be combined to form pouches, for example, the film can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or film, such as a water-soluble film, over and onto the web of open pouches and then sealing the first film and second film together. The second material or film can include the water-soluble film 10 described herein. It can be desirable for the surface of the second film on which the salt is distributed (or which is located more closely to the salt contained within the thickness of the film), to be oriented so that it forms an outer surface of the pouch.

In such a process, the first and second films are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al, incorporated herein by reference.

Articles of Manufacture

The present invention can also include articles of manufacture (or "articles") including a functional composition and a water-soluble film, which can be formed into a container, such as a pouch, a sachet, a capsule, a bag, etc. to hold the functional composition. The surface of the water-soluble film with the salt distributed more closely thereto can be disposed as or used to form an outside surface of the container. The water-soluble film can form at least a portion of a container that provides a unit dose of the functional composition.

For simplicity, the articles of interest herein will be described in terms of water-soluble pouches, although it should be understood that description herein also applies to other types of containers.

The pouches formed by the foregoing methods, can be of any form and shape which is suitable to hold the functional composition contained therein, until it is desired to release the functional composition from the water-soluble pouch, such as by immersion of the water-soluble pouch in water. The pouches can include one compartment, or two or more compartments (that is, the pouches can be multi-compartment pouches). In one embodiment, the water-soluble pouch can have two or more compartments that are in a generally superposed relationship and the pouch includes upper and lower generally opposing outer walls, skirt-like side walls, forming the sides of the pouch, and one or more internal partitioning walls, separating different compartments from one another. If the functional composition contained in the pouches includes different forms or components, the different components of the functional composition can be contained in different compartments of the water-soluble pouch and can be separated from one another by a barrier of water-soluble material.

The pouches or other containers can contain a unit dose of one or more compositions for use as laundry detergent compositions, automatic dishwashing detergent compositions, hard surface cleaners, stain removers, fabric enhancers and/or fabric softeners, and new product forms where contact with small amounts of water could create premature pouch dissolution, unwanted pouch leakage and/or undesirable pouch-to-pouch stickiness. The compositions in the pouches can be in any suitable form including, but not limited to: liquids, liqui-gels, gels, pastes, creams, solids, granules, and powders. The different compartments of multi-compartment pouches can be used to separate incompatible ingredients. For example, it can be desirable to separate bleaches and enzymes into separate compartments. Other forms of multi-compartment embodiments can include a powder-containing compartment in combination with a liquid-containing compartment. Additional examples of multiple compartment water-soluble pouches are disclosed in U.S. Pat. No. 6,670,314 B2 (Dec. 30, 2003), incorporated herein by reference.

The water-soluble pouches can be added any desirable aqueous liquid (such as hot or cold water), whereupon water-soluble film material forming the water-soluble pouches dissolves to release the contents of the pouches. The film and the pouches described herein can be soluble or dispersible in water, and have a water-solubility of at least about 50%, alternatively at least about 75%, or even at least about 95%, by weight. The solubility of the film and the pouches can be measured by a method of adding either a piece of film, or one of the pouches (including the film making up the same) to distilled water, stirring the distilled water containing either the film or pouch vigorously using a magnetic stirrer, and filtering the water containing the film or pouch using a glass-filter with a maximum pore size of 20 microns. The dry weight of material collected on the filter is then compared to the weight of the initial sample, and is expressed as a percentage.

EXAMPLES

The following examples are provided for illustration and are not intended to limit the scope of the invention. Unless otherwise stated, the proportions are by weight.

Example 1

Providing a Pouch Made From a Water-Soluble Film With Improved Resistance to Solubility In this example, a pre-made water-soluble pouch made from a water-soluble film is provided with improved resistance to solubility prior to being immersed in water. This is accomplished by dusting the outer surface of the pouch film with a salt.

A commercially available water-soluble pouch containing a unit dose of liquid laundry detergent known as ARIEL LIQUITABS detergent pouch is obtained from The Procter & Gamble Company in Europe. The contents of the ARIEL LIQUITABS detergent pouch are contained in a water-soluble film that includes at least some PVOH.

The outer surface of the ARIEL LIQUITABS detergent pouch is dusted with sodium sulfate powder that passes through either number 120 or number 270 size sieves. The amount of salt added to the water-soluble film can be expressed in terms of the amount of salt added onto the film as a percentage of the initial film weight (before the salt is added). The amount of salt that is added to the film is between about 2.5% and about 7%, of the initial film weight. The improved resistance to solubility when contacted by small amounts of water of three sets of samples created in this manner is shown in Table 2. If the samples are described as being deformed, they deform, but do not leak.

Example 2

Providing a Pouch Made From a Water-Soluble Film With Improved Resistance to Solubility In this example, a water-soluble pouch made from a water-soluble film is provided with improved resistance to solubility prior to being immersed in water. This is accomplished by at least partially dissolving the outer surface of the water-soluble film and then dusting the same with a salt.

Another ARIEL LIQUITABS detergent pouch containing a unit dose of liquid laundry detergent is obtained. The outer surface of the ARIEL LIQUITABS detergent pouch is wetted and dissolved part of the way into the depth of the film by applying water to the surface of the film surface using a wetting means (e.g. using a wet sponge, water mist; water spray, or the like). The wetted outer surface of the pouch is then dusted with sodium sulfate powder with an average particle size of less than or equal to about 150 microns. The pouch is then allowed to dry until the surface is dry to the touch. The excess sodium sulfate is removed by buffing the surface of the water-soluble pouch by contact with a towel, and the formation of the pouch with salt imbedded into the outer surface is complete.

The same steps described in Examples 1 and 2 above can also be used to provide a multi-compartment water-soluble pouch made from a water-soluble film with improved resistance to solubility. This can be done in the same manner as described in Examples 1 and 2 on a multi-compartment water-soluble pouch, such as a CASCADE ACTIONPAC multi-compartment water-soluble pouch containing a unit dose of automatic dishwasher detergent obtained from The Procter & Gamble Company in the United States.

Example 3

Formation of a Multi-Layer Water-Soluble Film

In this Example, a multi-layer water-soluble film having two layers is formed. Two solutions are made using Mono-Sol's M8630 film. The MonoSol M8630 film is dissolved into de-ionized water at 75-80° C. to form a solution. The two solutions include: a solution that contains no salt (Solution 1), and a solution that contains sodium sulfate (Solution 2). The compositions of these solutions are listed in Table 1.

TABLE 1

Composition of Solutions

| Material | Solution 1 Weight (gm) | Solution 2 Weight (gm) |
|---|---|---|
| M8630 Film | 254.78 | 228.20 |
| Sodium Sulfate | 0 | 10.68 |
| Water | 917.2 | 936.02 |
| Total | 1171.98 | 1174.90 |

Using a GARDCO Automatic Drawdown machine available from the Paul N. Gardner Company, Inc., Pompano Beach, Fla., U.S.A., with a #26 casting bar and a casting speed setting of 6.0, Solution 2 is cast into a film on a glass plate or glass slide. After casting, the slide is placed in an oven at 165° F. (74° C.) for 20 minutes. After 20 minutes at 165° F. (74° C.), the glass slide is removed from the oven and is placed back onto the GARDCO Automatic Drawdown machine. The thickness of this first casting is approximately 20 microns.

Using a #42/76 casting bar and a casting speed setting of 12.4, Solution 1 is cast into a film on top of the film on the glass slide produced using Solution 2. The glass slide is then placed in an oven at 165° F. (74° C.) for one hour. After one hour, the glass slide with the layers of water-soluble cast material thereon is removed from the oven, and placed in a room at 21° C. with a 40% RH for 24 hours to form a multi-layer film. The resulting thickness of the final multi-layer film is approximately 72 microns.

The water-soluble film formed herein can be used as a pouch material to form any suitable container (such as a water-soluble pouch) that holds any suitable functional composition.

Water Droplet Resistance Testing Method—Leak Test
The water droplet resistance test is performed by:
a) providing a water-soluble pouch;
b) applying a 0.001 to 0.01 ml room temperature water droplet to the center of one of the outer surfaces of the water-soluble pouch;
c) waiting 10 minutes; and
d) determining whether the water-soluble pouch leaks.
Pouch-to-Pouch Stickiness Test
The pouch-to-pouch stickiness test is performed by:
a) providing a test water-soluble pouch;
b) applying a 0.03 ml room temperature water droplet to the center of the outer film surface of the test water-soluble pouch;
c) providing a water-soluble pouch that does not include the water-soluble film described herein (an "unsalted" pouch);
d) placing the unsalted, water-soluble pouch on top of the wetted area of the test water-soluble pouch surface;
e) waiting 10 seconds; and
f) lifting the unsalted, water-soluble pouch six inches (15 cm); and
g) determining whether the test water-soluble pouch sticks to the unsalted, water-soluble pouch.

All tests are conducted under standard laboratory conditions, unless otherwise indicated.

Table 2 shows the results from a water droplet resistance test for a commercially available liquid laundry pouch (such as ARIEL LIQUITABS detergent pouch, obtained from The Procter & Gamble Company in Europe). Salt add-on weights are given as a percentage of film weight. The results indicate that the water-soluble pouches are resistant to premature pouch dissolution, unwanted pouch leakage and/or undesirable pouch-to-pouch stickiness since the salted, water-soluble pouches show over a 75% reduction in immediate leakage versus unsalted, water-soluble pouches.

TABLE 2

Water Droplet Resistance Testing

|  | Sample | | |
|---|---|---|---|
|  | 1 | 2 | 3 |
| Unsalted | Leaked | Leaked | Leaked |
| 7.0 wt % Salt No. 120 Sieve | Deformed | Deformed | Deformed |
| 4.0 wt % Salt No. 120 Sieve | Leaked | Deformed | Deformed |
| 2.5 wt % Salt No. 120 Sieve | Deformed | Deformed | Leaked |
| 7.0 wt % Salt No. 270 Sieve | Deformed | Deformed | Deformed |
| 4.0 wt % Salt No. 270 Sieve | Deformed | Deformed | Deformed |
| 2.5 wt % Salt No. 270 Sieve | Deformed | Leaked | Leaked |
| 4.0 wt % Spray Dried (No. 120) | Deformed | Deformed | Deformed |
| 7.0 wt % Spray Dried (No. 120) | Deformed | Deformed | Deformed |

It is also observed that $Na_2SO_4$ powdering reduces pouch-to-pouch stickiness. When a 0.03 ml water droplet is applied to the surface of a first unsalted, water-soluble pouch (e.g., CASCADE ACTIONPAC detergent pouch obtained from The Procter & Gamble Company in the United States), and then a second unsalted, water-soluble pouch is placed on top of the first unsalted, water-soluble pouch for 10 seconds, the two unsalted, water-soluble pouches become so strongly bound together that they cannot be peeled apart without tearing the water-soluble pouch material or water-soluble film. When this same procedure is performed on salted, water-soluble pouches, the salted, water-soluble pouches either do not stick or are easily shaken apart.

Example 4

Coating PVOH Films with Salt/Binder Solution

Various coating solutions shown in Table 3 below were prepared for coating a water-soluble PVOH film. All solutions included 0.2% by weight of PLURONIC L10 nonionic surfactant and various amounts of sodium sulfate anhydrous. The test solutions also included various amounts of carboxymethyl cellulose.

The substrate film was a plasticized, cold water-soluble film based on a medium molecular weight fully-hydrolyzed polyvinyl alcohol having carboxylate groups (MONOSOL M8630K film). The film was about 3 mils (about 75 microns) thick, weighing about 98 g/m², and having about 6 wt. % water.

TABLE 3

Salt Coating with CMC Binder

| Solution | DS | CMC (wt. %) | Sodium Sulfate (wt. %) | CMC 23° C. viscosity of 2 wt. % solution (cps) | Precipitation? |
|---|---|---|---|---|---|
| control | — | 0.0 | 20 | — | NO |
| 1 | 0.7 | 2.0 | 5 | 600 | NO |
| 2 | 0.7 | 2.0 | 10 | 600 | YES |
| 3 | 0.7 | 2.0 | 20 | 600 | YES |
| 4 | 0.7 | 4.0 | 10 | 600 | YES |
| 5 | 0.9 | 1.0 | 20 | 2,000 | NO |
| 6 | 1.2 | 1.0 | 20 | 2,000 | NO |
| 7 | 0.9 | 1.0 | 20 | 300 | NO |
| 8 | 0.9 | 1.0 | 20 | 30,000 | YES |
| 9 | 0.9 | 2.0 | 20 | 300 | NO |
| 10 | 1.2 | 1.0 | 20 | 350 | NO |

The coating solution was applied at about 6 g/m² resulting in approximately 1 to 1.5 g/m² dried coating weight.

Some solutions (2, 3, 4, and 8) had relatively too much salt for the particular grade (degree of substitution and molecular weight) and concentration of carboxymethyl cellulose used, and the polymer precipitated out at room temperature. Those coating solutions were not used.

The resulting control film provided a grainy salt which did not adhere well (tested by hand rubbing) and provided a grainy, hazy appearance on top of the film. The grain size was estimated to be at least 10 microns.

The films resulting from the coating of solutions 6 and 10 provided good results with salt better adhering to the surface of the PVOH film, with salt grains less visible, and better moisture resistance. No noticeable amount of salt rubbed off the film by handling. The grain size of salt was estimated to be about 1 micron.

The present invention, in various embodiments, can provide numerous advantages in addition to or in the alternative to providing the film with resistance to solubility when contacted with small amounts of water. Adding salt to the film can allow for thinner films to be constructed and/or films with greater solubility when immersed in water, since it is not as necessary to design the films with additional thickness for the purpose of providing resistance to solubility when contacted with small amounts of water. Providing films with resistance to solubility when contacted with small amounts of water in the manner described herein can allow a designer to retain the physical properties (e.g., solubility, flexibility, extensibility, and the like) and aesthetic properties (e.g., transparency or translucency, if transparent or translucent), as well as to maintain of these properties upon aging of the films to be substantially retained.

The foregoing description is given for clearness of understanding only, and no unnecessary limitations should be understood therefrom, as modifications within the scope of the invention may be apparent to those having ordinary skill in the art.

It should be understood that every maximum numerical limitation given throughout this specification would include every lower numerical limitation, as if such lower numerical limitations were all individually expressly written herein. Every minimum numerical limitation given throughout this, specification will include every higher numerical limitation, as if such higher numerical limitations were all individually expressly written herein. Every numerical range given throughout this specification will include every narrower numerical range that falls within such broader numerical range, as if such narrower numerical ranges were all individually expressly written herein.

Throughout the specification, where compositions are described as including components or materials, it is contemplated that the compositions can also consist essentially of, or consist of, any combination of the recited components or materials, unless described otherwise.

The practice of a method disclosed herein, and individual steps thereof, can be performed manually and/or with the aid of electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method. In addition, some of the individual steps can be combined, omitted, or further subdivided into additional steps.

What is claimed is:

1. An article, comprising:
a water-soluble film, comprising a first layer comprising a water-soluble polymer comprising one or both of polyvinyl alcohol (PVOH) and a PVOH copolymer, and a second layer comprising a salt and a binder comprising carboxymethyl cellulose, wherein the salt is bound to the first layer with the binder, wherein the binder comprises 40 wt. % or less of the second layer and wherein the salt is present in the second layer at a concentration greater than 50% by weight, based on the dry weight of the second layer.

2. The article of claim 1, wherein the water-soluble polymer consists of one or both of PVOH and a PVOH copolymer.

3. The article of claim 1, wherein the binder consists of carboxymethyl cellulose.

4. The article of claim 1, wherein the carboxymethyl cellulose has a degree of substitution of greater than 0.4.

5. The article of claim 1, wherein the carboxymethyl cellulose is characterized by a viscosity of a 2 wt. % solution at 25° C. of 15,000 cps or less.

6. The article of claim 1, wherein said salt comprises a cation selected from the group consisting of aluminum, ammonium, antimony, barium, bismuth, cadmium, calcium, cesium, copper, iron, lithium, magnesium, nickel, potassium, rubidium, silver, sodium, strontium, zinc, zirconium, and combinations thereof, with an anion selected from the group consisting of acetate, aluminum sulfate, azide, bicarbonate, bisulfite, borohydride, borooxalate, bromate, bromide, carbonate, chloride, chlorite, chromate, cyanate, cyanide, dichromate, disilicate, dithionate, ferricyanide, ferrocyanate, ferrocyanide, fluoride, fluoroantimonate, fluoroborate, fluorophosphate, fluorosulfonate, flurosilicate, hydrogen carbonate, hydrogen sulfate, hydrogen sulfite, hydrogencyanide, hydrogenophosphate, hydrogensulfate, hydrosulfite, hydroxide, hydroxostannate, hypochlorite, hyponitrite, hypophosphite, iodate, iodide, manganate, meta-aluminate, metaborate, metaperiodate, metasilicate, mixed halides, molybdate, nitrate, nitrite, orthophosphate, orthophosphite, orthosilicate, oxalate, oxalatoferrate, oxide, perborate, perchlorate, permanganate, peroxide, peroxydisulfate, phosphate, polybromide, polychloride, polyfluoride, polyiodide, polyphosphate, polysulfide, pyrosulfate, pyrosulfite, sesqui-carbonate, silicate, stannate, sulfamate, sulfate, sulfide, sulfite, thiocyanaate, thiosulfate, and combinations thereof; and combinations of any of the foregoing.

7. The article of claim 6, wherein the salt is selected from the group consisting of ammonium sulfate, potassium citrate, sodium sulfate, sodium citrate, sodium tripolyphosphate, zinc sulfate, and combinations thereof.

8. The article of claim 7, wherein the salt comprises sodium sulfate.

9. The article of claim 1, wherein the second layer comprises salt crystals with a maximum size of about 1 μm.

10. The article of claim 1, further comprising a surfactant in one or both of the first and second layers.

11. The article of claim 10, wherein the surfactant comprises a nonionic surfactant.

12. The article of claim 11, wherein the surfactant comprises a difunctional block copolymer comprising poly(ethylene oxide) and poly(propylene oxide) blocks and terminating in primary hydroxyl groups.

13. The article of claim 1, further comprising a plasticizer in the first layer.

14. The article of claim 13, wherein the plasticizer is selected from the group consisting of: glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and combinations thereof.

15. The article of claim 1, in the form of a sealed packet wherein the second layer is disposed as an outer surface of the packet.

16. An article, comprising:
a water-soluble film, comprising a first layer comprising a water-soluble polymer consisting of one or both of polyvinyl alcohol (PVOH) and a PVOH copolymer, and a second layer comprising sodium sulfate salt, the salt layer bound to the first layer with a binder comprising carboxymethyl cellulose having a degree of substitution of greater than 0.4, wherein the binder comprises 40 wt. % or less of the second layer, and wherein the salt is present in the second layer at a concentration greater than 50% by weight, based on the dry weight of the second layer.

17. The article of claim 1, wherein the PVOH, when present, has a degree of hydrolysis of less than 98%.

18. A multi-layer water-soluble film article, the film consisting of:
a first water-soluble layer comprising a water-soluble polymer comprising one or both polyvinyl alcohol (PVOH) and a PVOH copolymer, and
a second water-soluble layer comprising a dried composition of salt and a binder comprising carboxymethyl cellulose, wherein the salt is bound to the first layer with the binder, wherein the binder comprises 40 wt. % or less of the second layer and wherein the salt is present in the second layer at a concentration greater than 50% by weight, based on the dry weight of the second layer; and
optionally, one or more additional layers that, when present, are water-soluble.

19. A method of making the film of claim 1, comprising the steps of:
providing a water-soluble film substrate comprising a water-soluble polymer comprising one or both of PVOH and a PVOH copolymer;
forming a layer comprising a salt and a binder comprising carboxymethyl cellulose from an aqueous solution comprising the salt and the binder; and
binding the substrate and the layer comprising the salt to each other with the binder.

20. The method of claim 19, wherein the binding step comprises applying the aqueous solution to the substrate.

21. The method of claim 19, wherein the aqueous solution comprising the salt and the binder comprises about 0.1 wt. % to about 5 wt. % binder.

22. The method of claim 21, wherein the aqueous solution comprising the salt and the binder comprises about 0.1 wt. % to about 5 wt. % carboxymethyl cellulose.

23. The method of claim 19, wherein the aqueous solution further comprises a slow-drying liquid, wherein the slow drying liquid is less volatile than water.

24. The method of claim 23, wherein the slow-drying liquid is selected from the group consisting of glycols, polyols, glycol ethers, polyol ethers, and combinations thereof.

25. The method of claim 19, further comprising the step of forming a sealed packet comprising the bound substrate and layer comprising a salt wherein the layer comprising a salt is disposed as an outer surface of the packet.

* * * * *

UNITED STATES PATENT AND TRADEMARK OFFICE
CERTIFICATE OF CORRECTION

| | | |
|---|---|---|
| PATENT NO. | : 8,728,449 B2 | Page 1 of 1 |
| APPLICATION NO. | : 11/205377 | |
| DATED | : May 20, 2014 | |
| INVENTOR(S) | : Verrall et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this
Fifteenth Day of September, 2015

Michelle K. Lee
*Director of the United States Patent and Trademark Office*